United States Patent
Horn et al.

(10) Patent No.: US 8,318,507 B2
(45) Date of Patent: Nov. 27, 2012

(54) METHOD FOR THE FRACTIONATION AND SEPARATION OF PARTICLES BY STEP-WISE GRADIENT DENSITY EXTRACTION

(76) Inventors: Marcus Joseph Horn, Parsippany, NJ (US); Wenkui Lan, Livingston, NJ (US)

( * ) Notice: Subject to any disclaimer, the term of this patent is extended or adjusted under 35 U.S.C. 154(b) by 878 days.

(21) Appl. No.: 11/441,934

(22) Filed: May 26, 2006

(65) Prior Publication Data

US 2007/0272612 A1    Nov. 29, 2007

(51) Int. Cl.
*G01N 1/18* (2006.01)
*B01D 21/26* (2006.01)

(52) U.S. Cl. .......... 436/178; 436/177; 494/37; 210/787; 210/781; 210/800

(58) Field of Classification Search .......... 210/781, 210/782, 787, 805, 808; 436/45, 52, 177, 436/178; 422/72, 101, 533; 494/37, 28.3, 494/16

See application file for complete search history.

(56) References Cited

U.S. PATENT DOCUMENTS

| | | | |
|---|---|---|---|
| 4,096,035 A * | 6/1978 | Machlowitz et al. ...... | 435/252.1 |
| 4,177,921 A | 12/1979 | Nielsen | |
| 4,648,863 A * | 3/1987 | Nees ................ | 494/17 |
| 4,939,087 A * | 7/1990 | Van Wie et al. ........... | 435/394 |
| 5,403,745 A * | 4/1995 | Ollington et al. ........... | 435/11 |
| 5,786,898 A | 7/1998 | Fitzpatrick | |
| 6,652,136 B2 | 11/2003 | Marziali | |
| 6,821,757 B2 * | 11/2004 | Sauer et al. ............ | 435/91.1 |
| 2002/0131894 A1 * | 9/2002 | Anderson ............ | 422/61 |
| 2009/0265184 A1 | 10/2009 | Horn | |

FOREIGN PATENT DOCUMENTS

WO    9851412    11/1998

OTHER PUBLICATIONS

Application Sheet S52: Harvesting Gradients, Axis Shield Density Gradient Media, 2009, pp. 1-6.*
Havel et al., The distribution and chemical composition of ultracentrifugally separated lipoproteins in human serum, Sep. 1955, pp. 1345-1353.*
Evans et al., Effect of Storage at 4C and -20C on lipid, lipoprotein, and apolipoprotein concentrations, 1995, Clinical Chemistry, vol. 41, No. 3, pp. 392-396.*
Weiller et al., Analysis of lipoproteins by capillary zone electrophoresis in microfluidic devices: assay development and surface roughness measurements, Apr. 1, 2002, Analytical Chemistry, vol. 74, No. 7, pp. 1702-1711.*

(Continued)

*Primary Examiner* — Tony G Soohoo
*Assistant Examiner* — David C Mellon

(57) ABSTRACT

A method for the separation of particles of different densities using a step-wise gradient density extraction method as described herein where a sample is suspended in a liquid volume of an extracting medium of specific density and the particles that have a density less than or equal to that of the extracting medium of specific density can be recovered from a horizonatally rotatable hollow disk or a removable receptacle within a horizontally rotatable hollow disk designed for such purposes while the particles that have a density greater than the extracting medium of specific density form a deposit which can be cycled through the extraction process in an iterative fashion by varying the density of the extracting medium allowing the recovery of discrete particles of differing densities from a test sample.

32 Claims, 7 Drawing Sheets

OTHER PUBLICATIONS

Brousseau et al., Sequential ultracentrifugation micromethod for separation of serum lipoproteins and assays of lipids, apolioproteins, and lipoprotein particles, 1993, Journal of Clinical Chemistry, vol. 39, No. 6, pp. 960-964.*

Anderson, N. G., et al., "Preparative zonal centrifugation", Methods of Biochemical Analysis, vol. XV., Interscience Publishers, New York, (1967), 271-311.

Bondoc, Jr., L. L., et al., "Size distribution analysis of recombinant adenovirus using disc centrifugation", J. Ind. Microbiol. Biotechnol, 20, (1998), 317-322.

Gianello, R, et al., "Isolation of intestinal cell peroxisomes by rate-dependent banding in a vertical rotor", Biochem. Mol. Biol. Int., 30(3), (Jul. 1993), 505-15.

Herr, J. K., et al., "Aptamer-conjugation nanoparticles for selective collection and detection of cancer cells", Anal. Chem., 78(9), (2006), 2918-2924.

Kassab, J. R., et al., "Fast 'hyperlayer' separation development in sedimentation field flow fractionation", J. Chromatogr. B, 826, (2005), 8-16.

Marziali, A., et al., "An arrayable flow-through microcentrifuge for high-throughput instrumentation", Proc. Natl. Acad. Sci. USA, 96, (1999), 61-66.

Menys, V. C., et al., "Isolation of plasma small-dense low-density lipoprotein using a simple air-driven ultracentrifuge and quantification using immunoassay of apolipoprotein B", Clin. Chem. Lab. Med., 42(1), (2004), 30-36.

Norina, S. B., et al., "Image analysis of bioparticles accumulation and diamagnetic alignment in high-gradient magnetic field", J. Biomed. Opt., 10(5), (Sep.-Oct. 2005), 051702.

Pafko, W., "Centrifuge settling & filtration theory", Centrifuge settling & filtration theory, Chapter XII, Special Topics Report at www.pafko.com/wayne/docs/centrifuge.pdf, 1995.

Potts, J. L., et al., "Separation of lipoprotein fraction by ultracentrifugation: investigation of analytical recovery with sequential flotation and density gradient procedures", Clin. Chim. Acta., 230(2), (Oct. 31, 1994), 215-20.

Pretlow, II, T. G., et al., "Velocity sedimentation of organelles at low centrifugal force in an isokinetic gradient", Biochem. J., (1978), 174: 303-307.

Rickwood, D., "Centrifugation: A practical approach", Centrifugation: A practical approach, IRL Press, Oxford University, (1992).

Sahoo, S. K., et al., "Nanotech approaches to drug delivery and imaging", Drug Discovery Today, 8(24), (2003), 1112-1120.

Schumaker, V. N., et al., "Sequential flotation ultracentrifugation", Methods Enzymol., 128, (1986), 155-70.

Snoswell, M. A., et al., "Sizing biological samples by photosedimentation techniques", Biotechnol. Prog., 6, (1990), m255-261.

Young, B. D., et al., "The calculation of sedimentation coefficients in vertical rotors", J. Biochem. Biophys. Meth., 5, (1981), 95-104.

Written Opinion of the International Searching Authority for International Patent Application No. PCT/US2007/010538 issued Oct. 8, 2008.

International Search Report for International Patent Application No. PCT/US2007/010538 issued Oct. 8, 2008.

de Almeida, M., et al., "A Simple Method for Human Peripheral Blood Monocyte Isolation," Mem Inst Oswaldo Cruz, vol. 95, No. 2, Mar./Apr. 2000, p. 221-223.

Anderson, N., et al., "An Introduction to Particle Separations in Zonal Centrifuges", National Cancer Institute Monograph, No. 21, 1966, p. 9-39.

Bertram, T.A., et al., "Morphometry of Equine Neutrophils Isolated at Different Temperatures", Vet Pathol, vol. 19, 1982, p. 534-543.

Lawrence, J., et al., "Purification of Viruses by Centrifugation", Manual of Aquatic Viral Ecology, Chapter 17, 2010, p. 166-181.

"Harvesting Gradients", Application Sheet S52, Second Edition, Jan. 2009, p. 1-6.

Carlson, K., "Lipoprotein Fractionation"; J. clin. Path., 26, suppl. (Ass. Clin. Path.), 5, p. 32-37.

Sniegoski, L., et al., "Determination of Serum and Blood Densities", Analytical Chemistry, vol. 51, No. 9, Aug. 1979, p. 1577-1578.

Jensen, G., et al., "Determination of Background Serum Density for Lipoprotein Ultracentrifugation", Lipids, vol. 11, No. 10, Apr. 1978, p. 752-754.

* cited by examiner

| Fraction # | Sucrose % (w/v) | Protein Conc. (mg/ml) |
|---|---|---|
| 1 | 8.5 | 8.45 |
| 2 | 10 | 5.93 |
| 3 | 14 | 3.22 |
| 4 | 18 | 1.71 |
| 5 | 22 | 1.43 |
| 6 | 26 | 1.34 |
| 7 | 30 | 1.85 |
| 8 | 34 | 2.45 |
| 9 | 38 | 3.08 |
| 10 | 42 | 3.39 |
| 11 | 46 | 2.43 |
| 12 | 50 | 1.65 |
| 13 | 54 | 0.35 |
| 14 | 60 | 0 |
| PNS | 8.5 | 22.84 |

Figure 5

MALDI-QIT-TOF Spectrum of Spot 624

METHOD FOR THE FRACTIONATION AND SEPARATION OF PARTICLES BY STEP-WISE GRADIENT DENSITY EXTRACTION

FIELD OF THE INVENTION

The present invention relates to a method for the fractionation of particles, including biological particles, such as cellular compartments, cellular and subcellular particles, viruses, microorganisms, inclusion bodies, organelles from cell or tissue homogenates, organelles from cell lysates, lipoproteins and nano-particles, and non-biological particles such as micro-polymer particles (collectively "particles"), by the use of step-wise density gradient extraction, where said particles may be derived through recombinant or non-recombinant processes. Through an iterative series of substantially consecutive extractive steps, in which the density of the medium used to extract the particles is incrementally adjusted, the method described herein and variants thereof may be used to fractionate substantially well defined samples of particles from any source, including biological, chemical, or otherwise, on an analytical to a preparative scale.

BACKGROUND OF THE INVENTION

The efficient fractionation of biological particles from cell or tissue lysates or homogenates is crucial to the development of structural biology as a tool in applied proteomic and genomic technology. Subsequent identification and characterization of the particles recovered via fractionation may be facilitated by the method described herein. For example, the fractionation and enrichment of low abundance proteins from organelles is central to biomarker discovery in pharmaceutical drug development. Due to the heterogeneity of organellar particles, methods for isolation and characterization of functional low-abundance proteins specific to organellar compartments currently are very expensive, complex and time-consuming. Typically, standard methods for isolation of organelles involve multi-step centrifugations, including differential and density gradient ultracentrifugation, or electrophoretic separations. These methods usually require 24 to 48 hours to obtain acceptable separations. Furthermore, these classical fractionation methods have not kept pace with the increased sensitivity in protein analysis. The ability to supply a desired biological particles or organelles quickly and efficiently using the method described herein meets an unmet pharmaceutical and biomedical need for the identification of diagnostic markers in disease processes. Consequently, the need for an efficient, reproducible, and scalable method for the fractionation of biological particles has grown and will continue to proliferate as structural biology reveals new target proteins and organelles as points of possible intervention in the treatment of human disease processes.

Separation and purification of nano- and micro-particles are essential for any technical applications in numerous industrial fields including drug development, drug delivery, biosensors, coatings, and pigments. In recent research, aptamer-modified magnetic nano-particles and fluorescent nano-particles were demonstrated to have potential applications for cancer and other medical diagnostics (Herr, J. K. et al, Anal. Chem. 2006, 78(9), 2918-2924). Significant advantages have been shown in using bioconjugated nanoparticles for biosensing and bioimaging, such as cell staining, DNA detection and separation, rapid single bacterium detection, and biotechnological application in DNA protection. (Sahoo, S. K. and Labhasetwar V., Drug Discov Today. Dec. 15, 2003; (24): 1112-20) Fractionation and separation of these nano-particles to generate defined or uniform particles prior to or after applications can benefit from the method described herein.

Separation of particles can be accomplished by simple gravity sedimentation. In this procedure, the samples are allowed to sit and separation occurs due to the differences in the size and shape of the particles. Gravitational sedimentation has limited practical value for particles under a few micrometers in diameter due to the prohibitively long settling times. The sedimentation process can be accelerated by coupling driving forces including centrifugal force, magnetic force, electric force and other forces.

The most common methods to separate particles have involved the use of centrifugation including, differential, rate-zonal and isopycnic centrifugation. Overall the velocity of sedimentation of particles in a centrifugal field is described by the Stokes' equation:

$$v = \frac{d^2(\rho_p - \rho_l)}{18\eta}g$$

where
v=sedimentation velocity
d=diameter of particle
$\rho_l$=density of medium
$\rho_p$=density of particle
g=gravitational field (RCF)
$\eta$=viscosity of medium This velocity, the sedimentation velocity, is determined by the size, density and shape of the particle, as well as the viscosity of the medium through which it must travel and the centrifugal force generated.

In differential centrifugation, the suspension of particles in a medium is placed in a centrifuge tube and centrifuged for a specific period of time using a specific relative centrifugal force (RCF) to separate the group of largest particles. Then the supernatant is removed from the pellet into a separate tube, and recentrifuged for another specific period of time with another specific RCF to collect the group of the next largest particles. A series of pellets are obtained by the application of incremental increases in the RCF and time. In this process, the density of the medium is kept constant, particles are separated by changing centrifugal time and RCF, and the collected pellets are the resulting fractions of the separation. Obtaining a stable pellet using differential centrifugation depends upon the RCF, sedimentation velocity, and distance the cellular particle has to travel. The longer a sample is subjected to a specific RCF, the more likely the pellet will become contaminated by smaller particles intermixed with larger particles. The long sedimentation pathway between, and the difference in the RCF between the top and the bottom of the sample are primarily responsible for the lack of resolution and poor recoveries associated with the use of differential centrifugation. Differential centrifugation is an effective method at separation of particles into broad size classes but not suitable for separation of particles of similar sizes.

A method that results in greater resolution than differential centrifugation of all particle sizes is rate zonal gradient centrifugation. Practically, this is achieved by layering a suspension of particles on top of a preformed density gradient and then subjecting the sample to a specific RCF. Each particle size will migrate as a zone or band at a characteristic velocity. In this method, the density of the particles is always greater than the density of the liquid. In a continuous gradient, the density increases in a linear or non-linear fashion. By allowing the particles to sediment through such a density gradient, the resolution of particles is generally improved. The particles move down through the gradient in the form of discrete zones at a rate that depends primarily on their size. The centrifugation time needs to be tightly controlled—just long enough to separate the particles of interest. If the centrifugation time is too short, the particles will not separate sufficiently. If the centrifugation time is too long, some or all of the particles will end up in a pellet at the bottom of the tube. Another important limitation of using this method is that the volume of the sample is typically no more than about 5% by volume of the total volume of the density gradient used in the separation. Band broadening occurs when the capacity of the gradient is exceeded. A concentrated band of sedimentation particles can raise the density of the sample zone above that of the gradient immediately below it, leading to instability and band broadening.

Another commonly used centrifugation method for separation of particles is isopycnic centrifugation, which is also called equilibrium density gradient centrifugation. In this process, particles are either layered onto a gradient or dispensed throughout the gradient. Under centrifugal force, particles separate based on their buoyant densities, i.e., the particles migrate to a position within the gradient where their densities equal the density of the surrounding medium, called their isopycnic position. The advantage of isopycnic centrifugation over rate zonal density centrifugation is that the particles accumulate at their own equilibrium densities within the gradient as a result of the centrifugal force and the counteracting buoyant density of the gradient. Unlike rate zonal centrifugation, the sample volume may be as large as 80% of the total liquid volume. However, the resulting sample separation is distributed throughout the total fluid volume. Since it will take an infinite time to reach true equilibrium, the biggest limitation of isopycnic centrifugation is the damage to biological particles, particularly organelles, which is much greater than other methods. Because the centrifugation times are much longer, particles are exposed to potential damage or decomposition by both centrifugal force and high density gradients for extended periods of time. Additionally, long gradient columns may result in hydrostatic pressures sufficient to damage cell organelles.

Both rate zonal and isopycnic density centrifugation methods require the use of a density gradient medium for centrifugation to ensure stable sedimentation. Density gradients for isopycnic centrifugation can be either continuous, such as linear, convex, or discontinuous, while continuous density gradients are required for rate zonal centrifugation. Preparation of density gradients requires a certain level of skill in the art. Generally, density gradients can be prepared by using either a diffusion method, which requires up to 24 hours to form the gradient, or a gradient mixer. However, the shape and steepness of the gradient depends on the type of medium and the centrifugal force as well as the type of rotor used. Hence, it is difficult to ensure that the correct shape of the gradient is obtained. Another major disadvantage of both rate zonal and isopycnic density gradient centrifugation is defining the exact density of resulting fractions. Special instruments, such as refractometers, pycnometers and density meters, as well as calculations are required to determine the density of each resulting fraction.

Another commonly used method for the specific separation of lipoprotein particles is sequential flotation ultracentrifugation (Potts, J. L. et al., Clin Chim Acta, 1994, 230 (2), 215-220). In this process, the density of lipoprotein-containing liquid samples, such as plasma or serum, is adjusted by addition of solid salts, such as sodium chloride or sodium bromide, and subjected to ultracentrifugation. The top of the supernatant is removed, either by cutting off the upper portion of the centrifuge tube or by pipetting. Heavier lipoprotein particles are obtained by increasing the density of the remaining liquid sample by the further addition of solid salt, and further ultracentrifugation. Each ultracentrifugation step generally requires 20-40 hours. In addition to the disadvantage of lengthy process times, the sequential removal of substantial amounts of sample at each step and the need for the addition of solid salt significantly limits the utility of this method.

Magnetism is another force that can be used for the separation of particles. An applied magnetic field acting on micrometer and submicrometer particles having diamagnetic or paramagnetic susceptibility causes their movement. This process has been used in pigment production, nanomagnetics production for electronics and in bio-separation. Although the applied magnetic field can possibly exceed the centrifugal force, it has not been used to accelerate particle sedimentation.

Particles can also be separated by electrophoresis, a method which can separate particles based on their inherent charge and size and their subsequent migration in an applied electric field. For example, organelles are charged at neutral pH due to the presence of acidic and basic groups on their surface and will migrate in an applied electric field. The rate of movement is proportional to the charge and inversely proportional to the viscous drag, hence the rate of movement is strongly influenced by particle size. A limitation of this method is stabilizing the migrating zone of particles. Also, uneven heating of the liquid is generated by the electric current. Moreover, most of the major organelles appear to have rather similar electrophoretic mobility and it is often necessary to resort to modification of the surface charge enzymatically before a satisfactory separation can be achieved.

The instant method does not require the use of density gradients to separate particles. The separation media used are solutions of a specific density which can be incrementally adjusted during the practice of the method. The separation of particles is based on a step-wise gradient extraction of particles based on their density. The method of the invention relies upon the difference in density between subsets of particles in the sample and that of the extracting medium. Based on the Stokes' equation, particles that are equal to or lower in density than the density of the extracting medium will not pellet in the medium. Practically, these particles will float in the extracting medium while particles higher in density than the density of the medium will sediment towards the bottom of the extracting medium and form a pellet during centrifugation. The suspended particles may exist as a colloidal or polymeric mixture. Thus, the surface of the extracting medium is essentially a density barrier preventing the sedimentation of particles that are less dense than or equally as dense as the extracting medium. In this manner, the supernatant containing particles with a density less than or equal to the density of the extracting medium ($\rho_1^1$) can be isolated. The remaining pellet can then be resuspended in an extracting medium where the density has been increased incrementally ($\rho_1^2$) and then centrifuged at a specific speed over a specific period of time resulting in a supernatant containing particles that have a density in the range greater than ($\rho_1^1$) and less than or equal to ($\rho_1^2$).

The remaining pellet can then be optionally treated iteratively by the above method to obtain additional particles present in a sample depending upon their density. This iterative treatment may be optionally repeated until a desired density of the medium is reached or until no pellet is produced via centrifugation. Thus, the method demonstrates a step-wise extraction of particles from a pellet of a sample which is capable of differentiating substantially all the particles inherent to a particular sample via their density without the use of any type of density gradient currently used in most, if not all, centrifugal fractionations of particles.

The design of the centrifuge and the type rotor(s) employed to practice the above described method varies but the most common suitable design is based on a horizontally rotatable hollow disk driven by an air compressor which can be set to run at a wide variety of speeds to enable the fractionation of a wide variety of particles. Prepared samples can be loaded into the center of the horizontally rotatable hollow disk, at rest or in motion, at the start of the analysis. The rotation of the disk carries the various particles of the samples either to the surface of, or to within the suspension of, the liquid volume of the extracting medium of specific density contained within a sedimentation chamber in the horizontally rotatable hollow disk or to the pellet formed within the sedimentation chamber. After a specific period of time, the supernatant containing the extracted particles is removed by aspiration or other means from the sedimentation chamber. A new liquid volume of extracting medium of specific density then is added to resuspend the resultant pellet formed from the initial centrifugation of the sample. The method may then be repeated as many times as desired for the particular sample being analyzed.

Accordingly, there is a significant need in proteomic and genomic technology for an efficacious method for the fractionation of particles that is scale invariant, easily automated, generic for a broad range of particles and economical. It has now been surprisingly found that the use of step-wise density gradient extraction allows the defined fractionation of a wide variety of particles under conditions which are scale invariant, easily automated, and economically feasible for analytical to preparative samples.

SUMMARY OF THE INVENTION

Thus, it is an object of this invention to use a step-wise gradient density extraction of a mixture of particles by varying the density of the extracting medium to obtain particles of discrete density from the sample. The results obtained are analogous to those using a density gradient without the problems inherent in density gradient sedimentation.

It is a further object of this invention to provide a step-wise method whereby samples containing a wide variety of particles of differing densities may be efficiently fractionated by collecting those particles remaining suspended in a liquid volume of an extracting medium from each step and resuspending the resultant deposit in an extracting medium of different density ($\rho_1^2$) than the density of the initial extracting medium ($\rho_1^1$). Thus, if the density $\rho_1^2$ is greater than the density $\rho_1^1$, the extracted particles will necessarily have a density greater than ($\rho_1^1$) but less than or equal to ($\rho_1^2$). Essentially, the particles obtained in this manner will have a net buoyancy in the extracting medium.

It is a further object of this invention to provide a method to separate particles of different densities where the density difference is at least about 0.0001 grams/cm$^3$ to about 0.2 grams/cm$^3$ It is a further object of the invention to provide a method wherein the density-based step-wise extraction of particles continues in an iterative fashion until all particles have been extracted.

It is still further an object of the invention to increase the density of the extracting medium in increments of about 0.0001 grams/cm$^3$ to about 0.2 grams/cm$^3$ when the method is performed in an iterative fashion.

It is a further object of the invention to separate the particles of the sample in a sedimentation chamber of a horizontally rotatable hollow disk, in a manner that allows the suspension of particles to be removed from the deposited particles.

It is a further object of the invention to separate the particles of the sample within a sedimentation chamber of a removable receptacle within a horizontally rotatable hollow disk in a manner that allows the suspension of particles to be removed from the deposited particles.

It is a further object of the invention to separate the particles of the sample in a sedimentation chamber of a horizontally rotatable hollow disk designed in such a manner that allows the more dense particles to move through a very short path length within the liquid volume of the extracting medium before forming a deposit in the removable receptacle.

It is a further object of the invention to separate the particles of the sample within a sedimentation chamber of a removable receptacle in a horizontally rotatable hollow disk designed in such a manner that allows the more dense particles to move through a very short path length within the liquid volume of the extracting medium before forming a deposit in the removable receptacle.

It is a further object of the invention to provide a sedimentation chamber of a horizontally rotatable hollow disk, or a sedimentation chamber of a removable receptacle in a horizontally rotatable hollow disk, with a conically concave bottom side, wherein the bottom side rises from a bottom vertex at the center of the bottom side, at an angle of about 1 to about 10 degrees from the horizontal plane, to meet the vertical sides of the chamber, in such a manner as to allow the suspension of particles to be nearly totally removed from the chamber.

It is a further object of the invention to provide a sedimentation chamber of a horizontally rotatable hollow disk, or a sedimentation chamber of a removable receptacle in a horizontally rotatable hollow disk, with an inward taper, which taper joins the top of the vertical wall of the chamber with the horizontal top of the chamber at an angle of about 25 to about 65 degrees from the vertical plane, in such a manner as to prevent the deposited particles from forming a large, difficult to suspend particle mass at the internal intersection of the vertical wall and the horizontal top of the chamber.

It is a further object of this invention where the extracting medium of specific density is an aqueous solution, a non-aqueous solution, or any mixture of a non-aqueous and aqueous solution.

It is a further object of this invention to provide a method for separating particles of different densities from cell lysates or homogenates which originate from mammalian, plant, bacterial, yeast, or fungal cells.

It is a further object of the invention to separate particles of different densities by the application of a force to the particles, where the force applied may be centrifugal, magnetic, electrical, or mechanical.

It is a further object of the invention to separate particles consisting essentially of biological particles, proteins, nucleic acids, phospholipids, lipopolysaccharides, polysaccharides, pharmaceutically active drug substances and metabolites thereof, cellular compartments, cellular and subcellular particles, viruses, microorganisms, inclusion bodies, organelles from cell or tissue homogenates, organelles from cell lysates, protein-protein complexes, lipoproteins and nano-particles, and non-biological particles such as micropolymer particles and paramagnetic latex particles.

It is a further object of this invention to provide a method wherein the step-wise gradient density extraction of particles from a mixture of particles is based upon varying the density of the extracting medium while maintaining constant the time and centrifugal force applied at each step.

It is still a further object of this invention that the time the sample is subjected to centrifugal force is between about 1 minute to about 2 hours and the centrifugal force applied is between about 500 to 200,000 G.

It is a further object of this invention to provide a method wherein the step-wise gradient density extraction of particles requires a minimum amount of time for the separation of those particles having a density less than or equal to that of the extracting medium from those particles having a density greater than that of the extracting medium.

The basic structure of the invention involves a sedimentation chamber that can be filled with a suspension of sample in an extracting medium of a specific density. The preferred extracting medium is an aqueous solution of sucrose with a specific density. Accordingly, to effect a fractionation, the sample is always suspended in an extracting medium whose density is equal to or less than some fraction of the total particles in the sample. During centrifugation, the particles that have a density greater than that of the extracting medium migrate radially to the edge of the chamber and form a pellet along the surface of the chamber at a point furthest from the center of rotation. Particles having a density less than or equal to that of the extracting medium will essentially be suspended within the fluid in the chamber generally following Stokes' equation with their net buoyancy depending on the difference of the density of the particles and the density of the extracting medium in the centrifuge.

While the preferred embodiment of this invention utilizes a conventional, horizontally rotatable hollow disk with a sedimentation chamber as a component of an ultracentrifuge, the invention is not limited to any particular instrument design and may be applied successfully to any type of centrifuge. The method is contemplated to be performed using a semi-automated or fully automated protocol. The method of this invention can separate particles with a density difference of about 0.0001 $g/cm^3$ to about 0.2 $g/cm^3$. Thus, the method described herein is capable of the high resolution separation of particles. Additionally, the method can be applied to any combination of particles and fluid where the density of some fraction of the total particles is less than or equal to the density of the extracting medium of specific density.

To implement the method of this invention, a centrifuge, such as one of the horizontally rotatable hollow disk design, or a centrifuge, such as one where a removable receptacle within a horizontally rotatable hollow disk design may be used. At the start of the analysis, a sample of particles suspended in a liquid volume of a specific density is loaded into the sedimentation chamber of the horizontally rotatable hollow disk, or into the sedimentation chamber of the removable receptacle within the horizontally rotatable hollow disk which may be rotating or at rest. A typical sample volume can be in the range of about 0.001 to about 50 milliliters. After a sample is loaded into the sedimentation chamber the following occurs: the horizontally rotatable hollow disk, or the horizontally rotatable hollow disk and the removable receptacle within the hollow disk is accelerated to a specific speed, corresponding to a specific centrifugal force, and maintained at that speed for a specific time (the "initial sedimentation time") The sedimentation of the particles generally proceeds in accordance with Stokes' law. Typical initial sedimentation times are 1 minute to 2 hours. Thereafter, the horizontally rotatable hollow disk, or the horizontally rotatable hollow disk and the removable receptacle within, is decelerated in a controlled manner until it reaches a predetermined speed, which speed may also be zero. The liquid volume of specific density is then aspirated from the sedimentation chamber and analyzed. A pellet remains in the sedimentation chamber. The pellet remaining in the sedimentation chamber is then subjected to an extraction process which proceeds as follows. The pellet is resuspended in a liquid volume of extracting medium having a specific density which is different from that of the density of the initial suspension. A typical liquid volume of extracting medium of specific density can be in the range of about 0.001 to about 50 milliliters. After the pellet is resuspended, the horizontally rotatable hollow disk, or the horizontally rotatable hollow disk and the removable receptacle within is accelerated to a specific speed, corresponding to a specific centrifugal force, and maintained at that speed for a specific time (the "sedimentation time"). The sedimentation of the particles generally proceeds in accordance with Stokes' law. Typical sedimentation times are from 1 minute to 30 minutes. Thereafter, the horizontally rotatable hollow disk, or the rotatable hollow disk and the removable receptacle within, is decelerated in a controlled manner until it reaches a predetermined speed, which speed may also be zero. The liquid volume of extracting medium of a specific density is then aspirated from the sedimentation chamber and analyzed. This extraction process can be repeated as many times as desired to obtain a profile of particles that differ in density.

It is yet a further object of this invention to use the method described herein to target a specific density difference in a sample and perform the method using only two specific densities to obtain only particles within the density range selected. The selected density difference can be at least 0.0001 $g/cm^3$ to about 0.2 $g/cm^3$.

These and other objects of the invention will become apparent to one of ordinary skill in the art upon review of the specification and claims.

In accordance with the present invention, we have discovered an efficient process for the separation of particles. This process reduces the need for cumbersome steps conventionally used to produce particles of interest with a substantially defined density. Once optimized, the process is scale invariant allowing the production of analytical to preparative samples of desired particles by semi-automated or automated protocols.

BRIEF DESCRIPTION OF THE FIGURES

FIG. 5 illustrates the protein concentrations from fractionation steps obtained using the method of the invention.

DETAILED DESCRIPTION OF THE INVENTION

Figure 1:
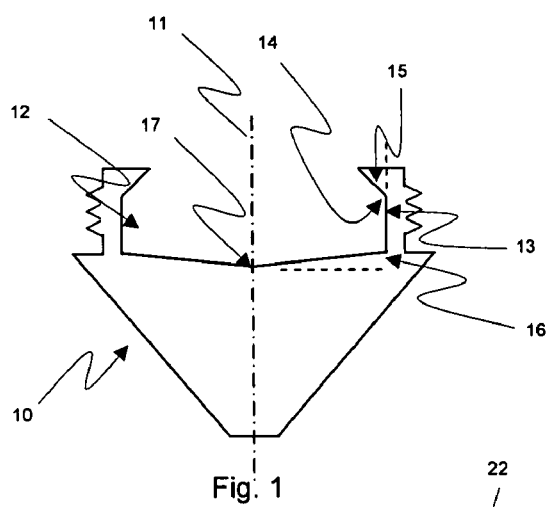
FIG. 1 illustrates a side cross-sectional view of a section of a horizontally rotatable hollow disk used to practice the method described herein.

FIG. 1. illustrates a side cross-sectional view of a section of a horizontally rotatable hollow disk 10 used to practice the method described herein. The horizontally rotatable hollow disk 10 rotates around its axis of rotation 11 and has a sedimentation chamber 12 for the fractionation of a sample containing particles. Upon the application of centrifugal force to the sample, those particles having greater density than the extracting medium will be deposited on the vertical wall 13 of the sedimentation chamber. It was surprisingly found that particles deposited in a large, tightly deposited mass, which was difficult to resuspend, at the top of the vertical wall 14 when the angle of the chamber top edge 15 was 90 degrees. It was found that as the angle 15 was made more acute, the deposited mass became easier to resuspend. As angle 15 approached 0 degrees, however, the particles rose higher on the vertical wall, adversely affecting the efficiency of the deposition. While values of about 25 to about 65 degrees for angle 15 are effective, a value of about 45 degrees is the preferred angle. When the bottom of the sedimentation chamber is flat, i.e., when angle 16 is 0 degrees, it is difficult to remove nearly all of the suspended particles from the sedimentation chamber. Increasing the angle 16 of the bottom of sedimentation chamber radially in relationship to the horizontal plane creates a conical concavity 17 at the bottom of the chamber. As angle 16 increases, however, it becomes more difficult to move the medium up the slope to the wall. Angles of about 1 to about 10 degrees provide a useful concavity, with an angle of 5 degrees being preferred. The concavity thus formed provides a suitable position from which to remove the particle suspension following the depositing of particles. Since the vertex of the concavity 17 is on the axis of rotation 11, automation of the method is facilitated by a single point of addition and removal of media.

Figure 1A:
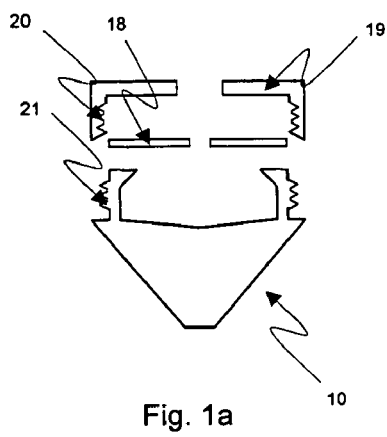
FIG. 1a illustrates a side cross-sectional view of a section of the components of a horizontally rotatable hollow disk assembly used to practice the method described herein.

FIG. 1a illustrates a side cross-sectional view of a section of the components of a horizontally rotatable hollow disk assembly used to practice the method described herein. The assembly includes the horizontally rotatable hollow disk 10 having external threads 21 which engage the internal threads 20 of the hollow disk cap 19. A sealing disk 18 provides a seal between the cap and and the horizontally rotatable hollow disk.

Figure 1B:
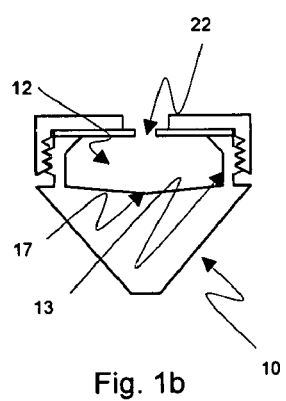
FIG. 1b illustrates a side cross-sectional view of a section of a horizontally rotatable hollow disk assembly used to practice the method described herein.

FIG. 1b illustrates a side cross-sectional view of a section of a horizontally rotatable hollow disk assembly used to practice the method described herein. When the components of FIG. 1a are assembled, the horizontally rotatable hollow disk 10 becomes part of an assembly having a sedimentation chamber 12, a vertical wall 13 onto which to deposit particles, a concavity 17 from which to nearly totally remove suspended particles, and an opening 22 through which to add and remove sample.

Figure 1C:
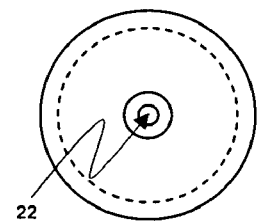
FIG. 1c illustrates a top view of a horizontally rotatable hollow disk assembly used to practice the method described herein.

FIG. 1c illustrates a top view of a horizontally rotatable hollow disk assembly used to practice the method described herein, and shows the opening 22 through which sample is added or removed.

At times, it may be preferable to practice the method in a removable receptacle to eliminate the need for stringent cleaning of the horizontally rotatable hollow disk between every sample fractionation. A removable receptacle provides a disposable receptacle for use with every fractionation, removing the need for stringent cleaning, and providing a reproducible environment for every fractionation. The removable receptacle is preferably made of polyethylene or polypropylene. The removable receptacle embodies most of the characteristics of the horizontally rotatable hollow disk and its assembly described previously and in FIGS. 1-1c.

Figure 2:
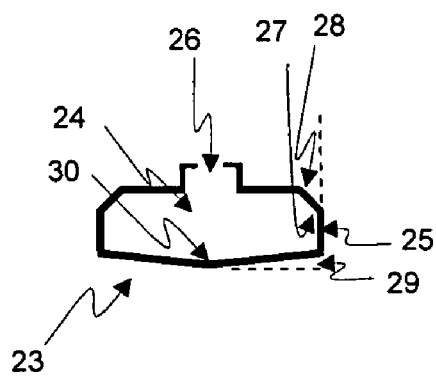
FIG. 2 illustrates a side cross-sectional view of a section of a removable receptacle used in a horizontally rotatable hollow disk used to practice the method described herein.

FIG. 2 illustrates a side cross-sectional view of a section of a removable receptacle used in a horizontally rotatable hollow disk used to practice the method described herein. The removable receptacle 23 contains a sedimentation chamber 24. Sample is loaded into the sedimentation chamber through opening 26 and particles that are more dense than the sample medium are deposited on the inside of the vertical wall 25 following application of centrifugal force to the removable receptacle when used in a horizontally rotatable hollow disk. In a manner similar to the description above, particles which deposited in a large, tightly deposited mass, at the top of the vertical wall 27 when the angle of the chamber top edge 28 was 90 degrees became easier to suspend as the angle 28 was made more acute. As angle 28 approached 0 degrees, however, the particles rose higher on the vertical wall, adversely affecting the efficiency of the deposition. While values of about 25 to about 65 degrees for 28 are effective, a value of about 45 degrees is the preferred angle. When the bottom of the sedimentation chamber is flat, i.e., when angle 29 is 0 degrees, it is difficult to remove nearly all of the suspended particles from the sedimentation chamber. Increasing the angle 29 of the bottom of sedimentation chamber radially in relationship to the horizontal plane creates a conical concavity 30 at the bottom of the chamber. As the angle increases, however, it becomes more difficult to move the medium up the slope to the wall. Angles of about 1 to about 10 degrees provide a useful concavity, with an angle of about 5 degrees being preferred. The concavity thus formed provides a suitable position from which to remove the particle suspension following the depositing of particles. Since the vertex of the concavity 30 is on the axis of rotation of the removable receptacle, automation of the method is facilitated by a single point of addition and removal of media.

Figure 2A:
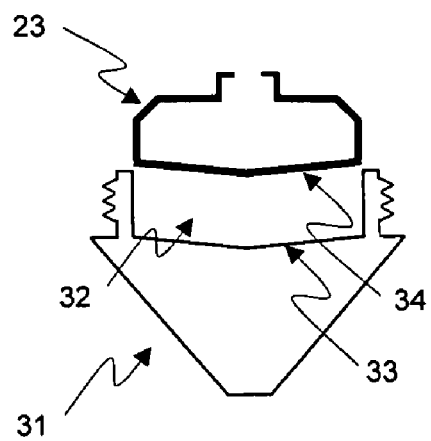
FIG. 2a illustrates a side cross-sectional view of a section of a removable receptacle as used in a horizontally rotatable hollow disk used to practice the method described herein.

FIG. 2a illustrates a side cross-sectional view of a section of a removable receptacle as used in a horizontally rotatable hollow disk used to practice the method described herein. The horizontally rotatable hollow disk 31 used with the removable receptacle 23 differs from the horizontally rotatable hollow disk of FIGS. 1-1c in that it does not contain a sedimentation chamber, and is intended the hold the removable receptacle during the practice of the method described herein. The receptacle is held within a chamber 32 contained within the horizontally rotatable hollow disk 31. The contour 33 of the bottom of this chamber matches the contour 34 of the bottom of the removable receptacle.

Figure 2B:
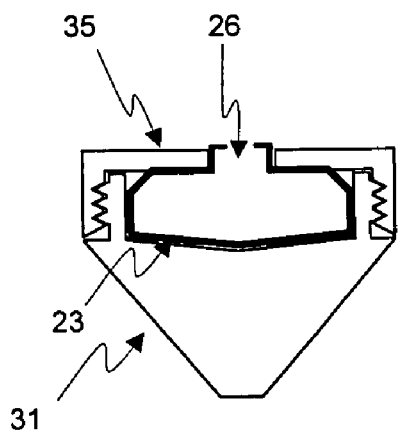
FIG. 2b illustrates a side cross-sectional view of a section of a removable receptacle and the horizontally rotatable hollow disk assembly used to practice the method described herein.

FIG. 2b illustrates a side cross-sectional view of a section of a removable receptacle and the horizontally rotatable hollow disk assembly used to practice the method described herein. During the practice of the method described herein, the removable receptacle 23 is held in place within the horizontally rotatable hollow disk 31 by a cap 36. Sample can be added or removed through the opening 26 in the removable receptacle.

Figure 2C:
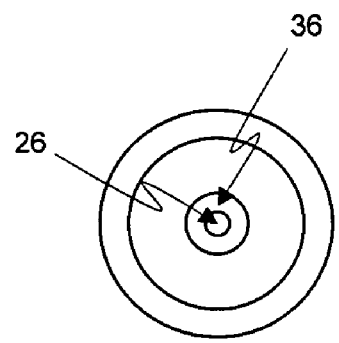
FIG. 2c illustrates a top view of a removable receptacle and the horizontally rotatable hollow disk assembly used to practice the method described herein.

FIG. 2c illustrates a top view of a removable receptacle and the horizontally rotatable hollow disk assembly used to practice the method described herein. Sample is added through the opening 26 in the top of the removable receptacle. A portion 36 of the top of the removable receptacle protrudes through the cap.

Figure 3:
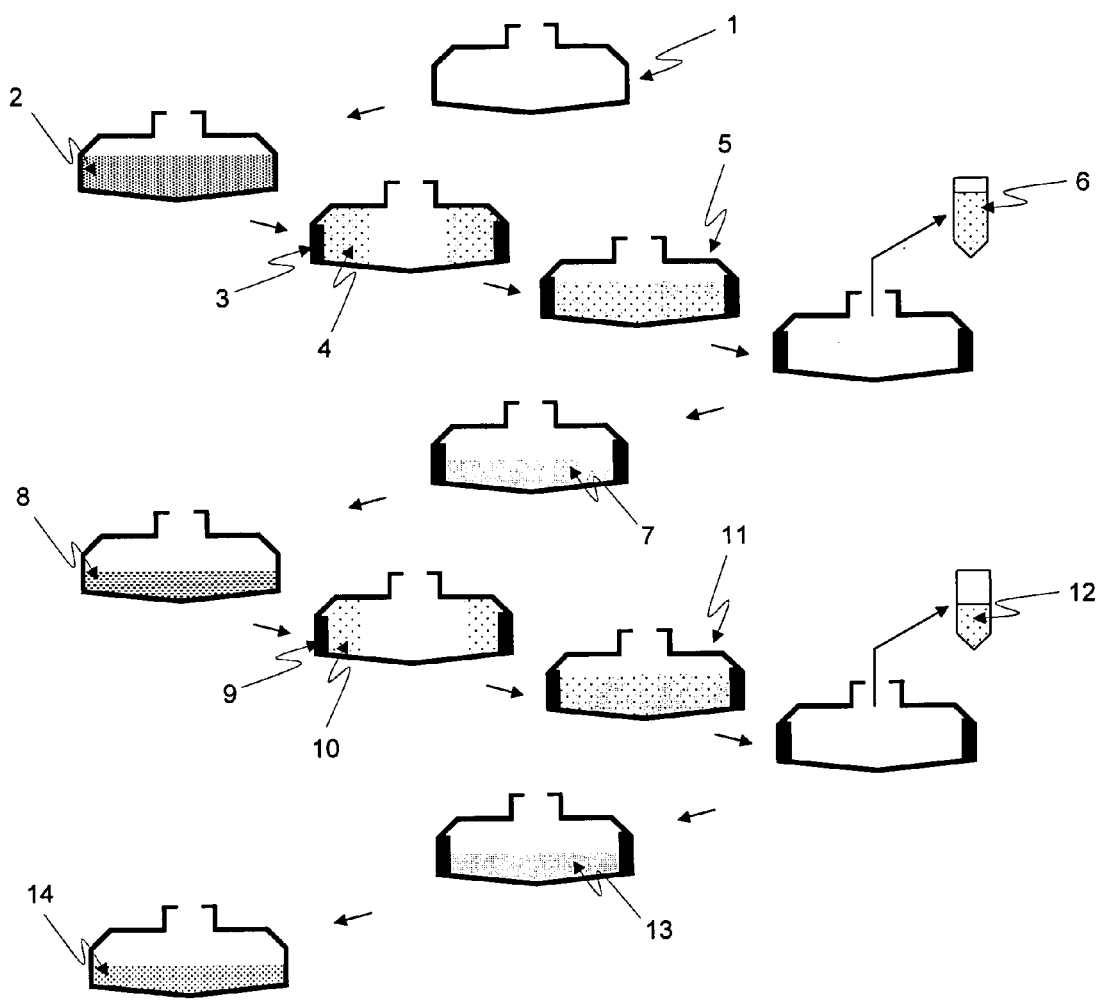
FIG. 3 illustrates the various steps generally used in the practice the method described herein.

FIG. 3 illustrates the various steps generally used in the practice the method described herein. While this illustration demonstrates the use of the removable receptacle in the practice of the method and does not show the associated horizontally rotatable hollow disk, it should be implied that the associated horizontally rotatable hollow disk is used in the practice of the method together with the removable receptacle. While this illustration demonstrates the use of the removable rotor in the practice of the method, this illustration is analogous to the use of the horizontally rotatable hollow disk described above and in FIGS. 1-1c.

An empty removable receptacle 1 is loaded with an initial suspension of particles 2 in an extracting medium of specific density. The receptacle is subjected to a specific centrifugal force for a specific amount of time. Those particles having densities greater than the density of the loaded extracting medium are deposited on the vertical wall 3 of the sedimentation chamber, while those particles with density equal to or lower than the density of the extracting medium remain suspended 4. The receptacle is decelerated allowing the suspended particles to reorient to a horizontal orientation 5. The particle suspension is removed from the receptacle and retained as the first extract 6. To the receptacle, containing particles on its walls is added an extracting medium 7 of a different specific density. Generally this extracting medium is of higher density than the previous extracting medium. The particles deposited on the walls are resuspended 8 by agitation. This agitation may be vortexing, stirring or other means. The receptacle is subjected to a specific centrifugal force for a specific amount of time. Those particles having densities greater than the density of the loaded extracting medium are deposited on the vertical wall 9 of the sedimentation chamber, while those particles with density equal to or lower than the density of the extracting medium remain suspended 10. The receptacle is decelerated allowing the suspended particles to reorient to a horizontal orientation 11. The particle suspension is removed from the receptacle and retained as the second extract 12. To the receptacle, containing particles on its walls is added an extracting medium 13 of a different specific density. Generally this extracting medium is of higher density than the previous extracting medium. The particles deposited on the walls are resuspended 14 by agitation. This agitation may be vortexing, stirring or other means. This process may be repeated iteratively until the desired fractionation is achieved.

The extracting medium is usually a defined mixture of sucrose and distilled and deionized water containing a salt buffer well-known to those skilled in the art. Typical salt buffers include 10 mM HEPES, 10 mM KCl, and 1 mM EDTA. Other salts suitable for use include Tris-HCl, NaCl, CHAPS, et al. The amount of sucrose used can vary between 4 to about 75 percent by weight of an aqueous solution. Other sugars, such as mannose, fructose or glucose can be substituted for sucrose in practicing the invention. Further, compounds such as cesium chloride or potassium bromide may be substituted for sucrose in the preparation of an extracting medium.

Synthetic reagents can also be substituted for sucrose in the preparation of the extracting medium. These include, but are not limited to, Percoll, Nycodenz, Optiprep™, NycoPrep™ Universal, Nycodenz™ and LymphoPrep™ (Available from Axis-Shield, Oslo, Norway).

Particles that may be isolated by the method described herein include, but are not limited to, human blood, human mononuclear cells, human monocytes and lymphocytes, polymorphonuclear leucocytes, human blood platelets, fractionation of neuronal cells, epithelial cells, human erythrocytes and reticulocytes, nuclei, lipid rich and other plasma membrane domains, ribonucleoproteins, DNA, RNA, plasma lipoproteins, lipo-polysaccharides, organelles and sub-cellular compartments, viruses, bacteria, high density lipoproteins, low density lipoproteins, and amyloid proteins.

EXAMPLE 1

Subcellular Particle Fractionation and Proteomics Study of Rat Liver

Figure 4:
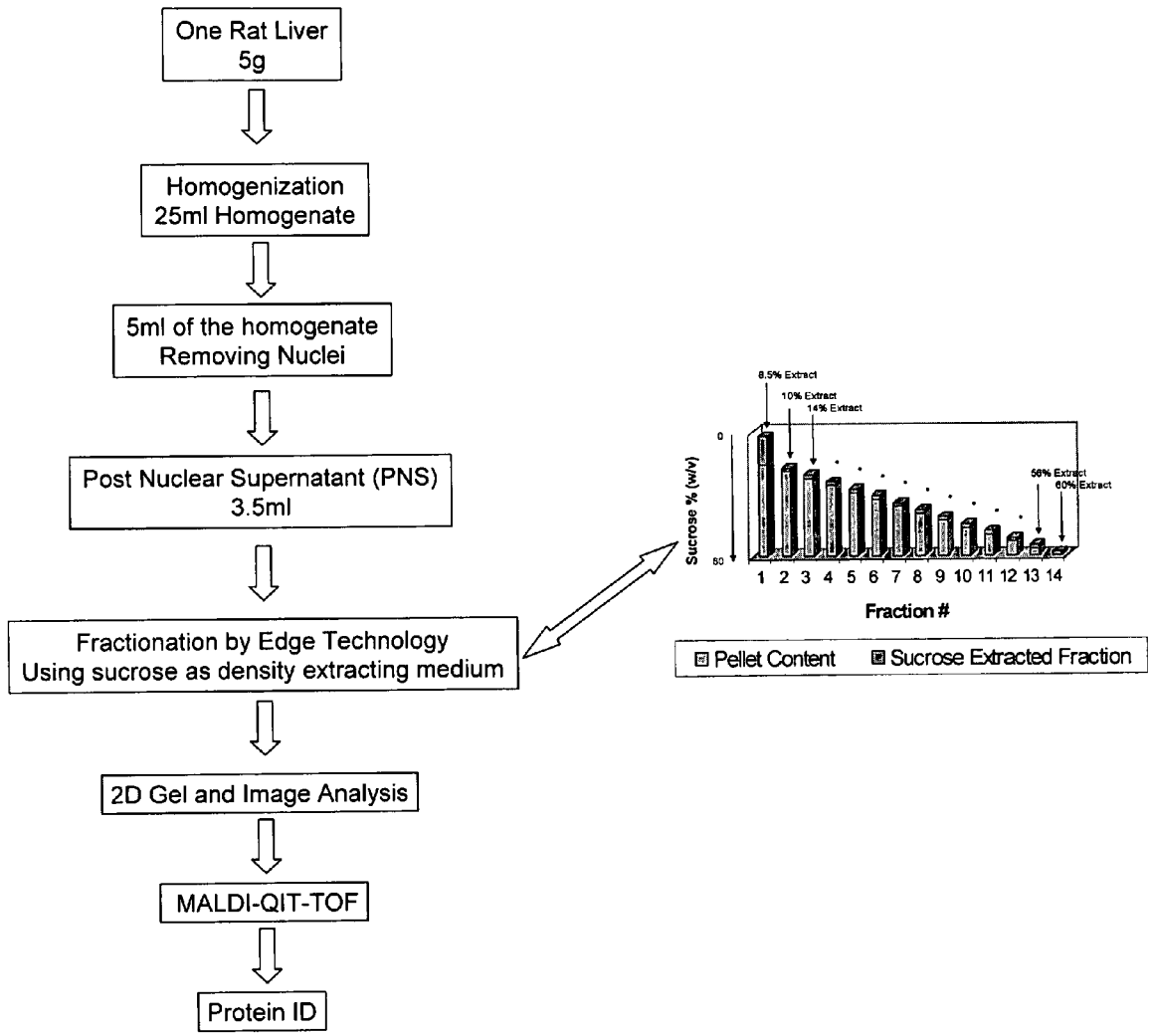
FIG. 4 illustrates the protocol used to perform a subcellular fractionation of rat liver and proteomics analysis.

The work flow of the rat liver subcellular fractionation and proteomics analysis is shown in FIG. 4.

I. Post Nuclear Supernatant Preparation: A rat liver post nuclear supernatant (PNS) from rat liver was prepared from a Sprague-Dawley rat (7-8 weeks of age). One frozen rat liver (about 5 g, Pel-Freez, Fayetteville, Ariz.) was thawed in 10 ml homogenization buffer (250 mM sucrose, 10 mM HEPES, 10 mM KCl, 1 mM EDTA, 10 µl protease inhibitor cocktail solution, pH 7.4) at 4° C. until the liver tissue turned soft. The thawed rat liver was diced into about 3 mm pieces with a pair of sharp scissors in the homogenization buffer. To the diced liver and homogenization buffer suspension was added an additional 10 ml of homogenization buffer. Half of the diced liver suspension was transferred to a prechilled 15 ml glass Dounce homogenizer. The rat liver was homogenized for 18-20 stokes using a loose pestle. The liver homogenate was transferred to a 50 ml tube. The second half of the diced liver suspension was homogenized using the same procedure, and was pooled together with the first batch of the homogenate and mixed well. The entire homogenization process was performed on ice. The volume of the total homogenate was about 25 ml. A 5 ml sample was removed from the total homogenate and was used for further processing. Nuclei were removed from this homogenate by low speed centrifugation (1000×G RCF) for 10 minutes using a fixed angle rotor. The nuclear pellet was discarded and the PNS (3.5 ml) was stored on ice for the following process.

II. Fractionation of the PNS: Prior to fractionation, 10 µl of the PNS was transferred to a separated container and used as a control sample for the analysis. Subsequently, a 2 ml sample of the PNS was loaded into a sedimentation chamber of a polyethylene receptacle having a volume of approximately 2.5 ml. This receptacle was then inserted into a horizontally rotatable hollow disk. The sedimentation chamber was accelerated to 91,000 revolutions per minute (rpm) in an air-driven centrifuge at air pressure of 35 psi. The centrifuge speed was maintained at 91000 rpm for 30 minutes. Following the 30 minute spin, the centrifuge was decelerated to the rest. The supernatant was aspirated from the polyethylene receptacle into a container, leaving a pelleted mass within the receptacle. The remainder of the PNS (1.5 ml) was loaded into the receptacle and the 91,000 rpm centrifugation step was repeated. The supernatant was aspirated from the receptacle, leaving additional pelleted mass, and was combined with the first supernatant. To the sedimentation chamber of the receptacle containing the combined pelleted masses was added 0.5 ml extract medium (10 mM HEPES, 10 mM KCl, 1 mM EDTA, pH 7.4) containing 10% sucrose (w/v). The receptacle then was vortexed for 5-6 minutes to suspend the pellet. The receptacle was inserted into the horizontally rotatable hollow disk. The sedimentation chamber was accelerated to 91000 rpm and maintained at that speed for 2 minutes. After the centrifuge was decelerated to rest, the supernatant, the first extract fraction, was aspirated to a microcentrifuge tube for further analysis, leaving pelleted mass. To the sedimentation chamber of the receptacle containing the combined pelleted masses was added 0.5 ml extract medium (10 mM HEPES, 10 mM KCl, 1 mM EDTA, pH 7.4) containing 14% sucrose (w/v). The receptacle then was vortexed for 30-60 seconds to suspend the pellet. Then the receptacle was inserted into the horizontally rotatable hollow disk, which was accelerated to 91000 rpm. This extraction process was repeated using extract medium containing incrementally increasing amounts of sucrose (w/v)—18%, 22%, 26%, 30%, 34%, 38%, 42%, 46%, 48%, 52%, 56%, and 60%—to obtain a total of 14 extracted fractions including the first supernatant. The fractions were stored at 4° C. for further analysis.

III. Protein Assay: Protein concentration of each fraction, including the starting material PNS was determined using BCA assay kit from Pierce Biotechnology Inc, (Rockford, Ill.). (FIG. 5 shows the protein concentrations of the 14 fractions and PNS.)

Figure 6:
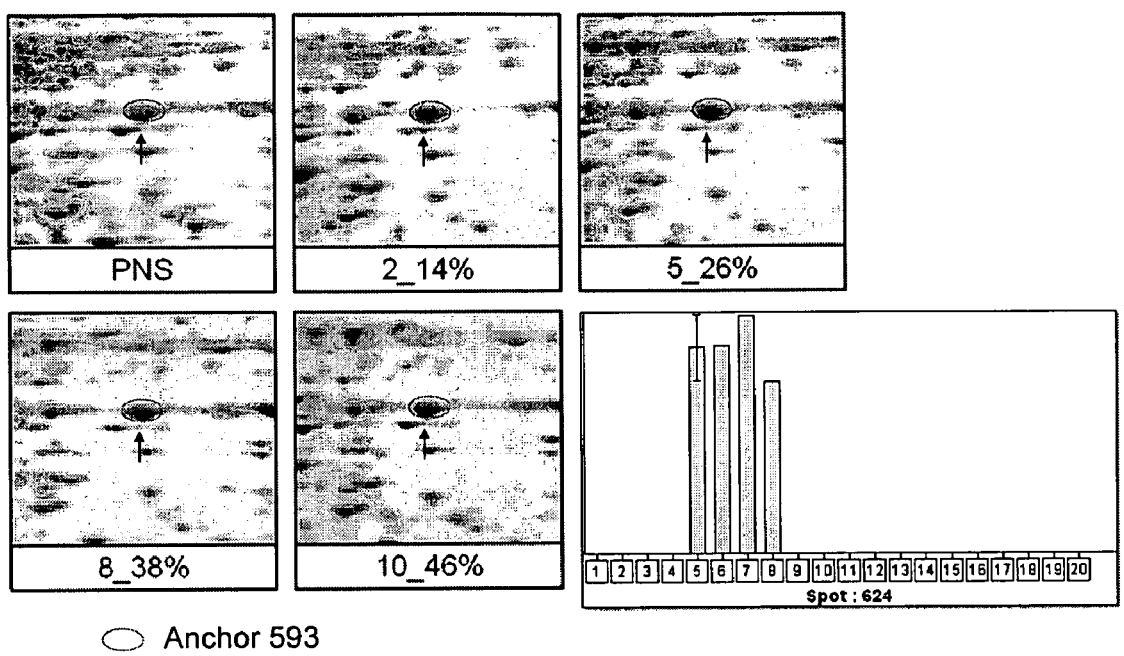
FIG. 6 illustrates the 2D gel image of selected fractions and PNS as well as the histogram of protein spot 624 from the 2D gel image analysis.

IV. Two dimensional gel electrophoresis (2DE) and Gel Imaging analysis: PNS and four (4) fractions—14%, 26%, 38% and 46%—were selected for 2DE and imaging analysis. The fractions were first subjected to buffer exchange and reduction/alkylation. To each fraction, one volume of COMS solution (40 mM Tris, 7M Urea, 2M Thiourea and 1% C7 detergent) was added, and samples were reduced with tributylphosphine and alkylated with acrylamide followed by ultra-filtration in an Amicon ultra 10 kD cutoff spin column. The >10 kD fraction was then precipitated with nine volumes of acetone. The precipitated protein was solublized in resuspension reagent (7M Urea, 2M Thiourea and 2% CHAPS), quantitated by the Bradford assay and 100 g of each sample was subjected to isoelectric focusing (IEF) on 11 cm IPG strips (Bio-Rad, Hercules, Calif.) with an 3-10 pH range. Following IEF, IPG strips were equilibrated in 6M urea, 2% SDS, 50 mM Tris-acetate buffer (pH 7.0), 0.01% bromophenol blue and subjected to SDS polyacrylamide gel electrophoresis on Bio-Rad 8-16% criterion gels. Gels were then fixed in 10% methanol/7% acetic acid for two hours and stained overnight in Sypro Ruby followed by destaining in 10% methanol/7% acetic and imaged on the Bio-Rad gel doc. Images were subjected to image analysis using PG240 software from Nonlinear Dynamics (Nonlinear USA, Durham, N.C.). FIG. 6 shows the 2D gel image of the 4 fractions and PNS as well as the histogram of the protein spot 624 from 2D gel image analysis.

V. Selected gel spot cutting and in-gel digestion: Five anchor spots and five spots of interest from the 2D gels were excised by Bio-Rad EXQuest gel cutter. Each gel piece was transferred to an individual microcentrifuge tube. The gel pieces were first washed with 30% acetonitrile in 0.1 M ammonium bicarbonate for 10 minutes to remove the gel stain, and then washed with water and dried with speedvac evaporator. The pieces were swollen with 40 µl of 3 mM Tris-HCl, pH 8.8, containing 0.2 µg trypsin (Promega, Madison, Wis.). Digestion was performed for 12 hours at room temperature.

Figure 7:
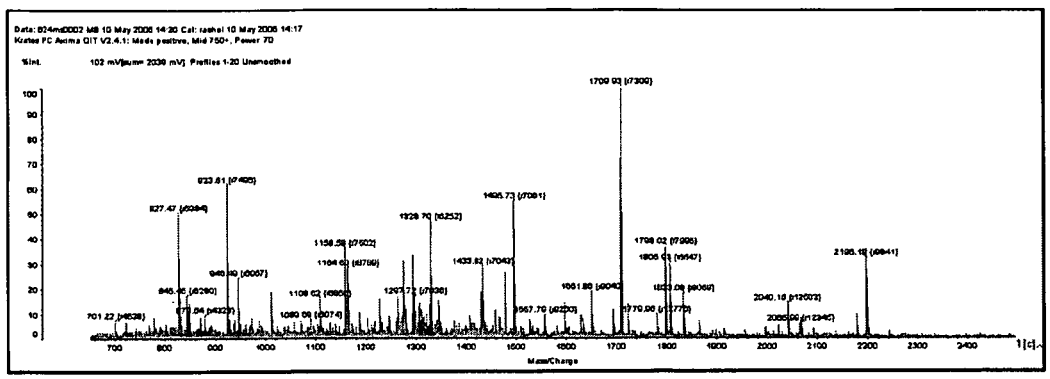
FIG. 7 illustrates the MALDI-QIT-TOF spectrum and MS/MS spectra of protein spot 624.
Figure 7:
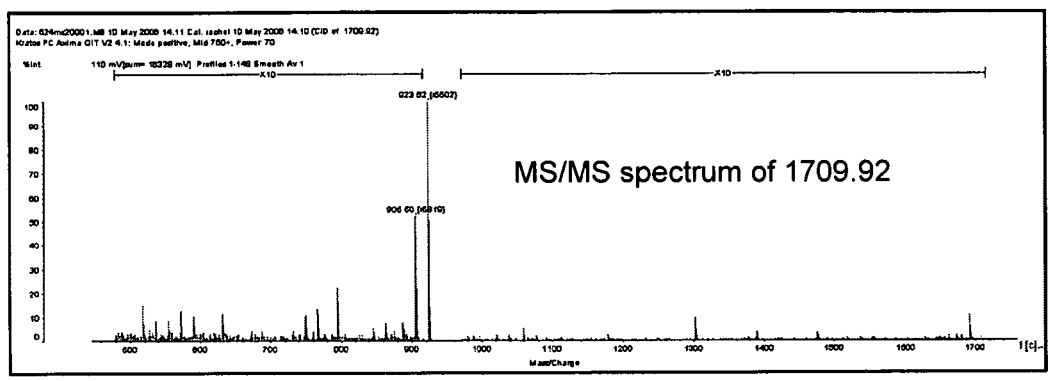
Figure 7:
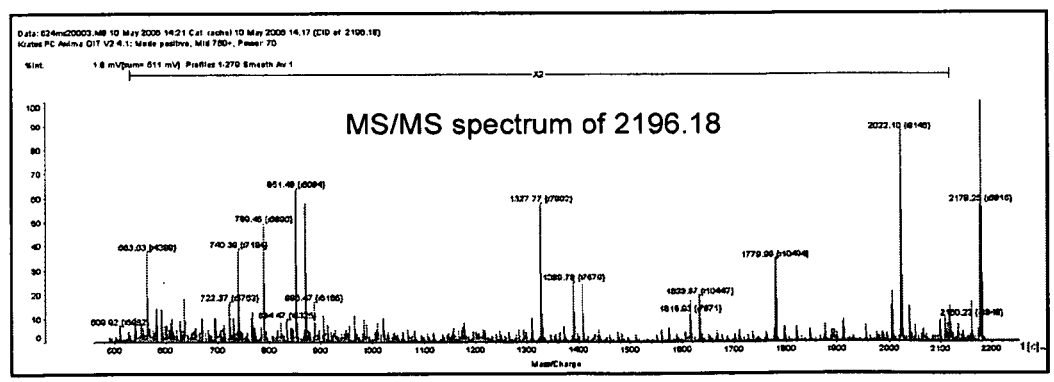

VI. Mass spectrometry (MALDI-QIT-TOF): The digested fractions were first purified via micro Zip Tipping. Briefly, the samples were dried down to a 10 µl volume and acidified with 1-2 µl of 1% trifluoroacetic acid (TFA). The samples were then loaded on an uC18 Zip Tip (Millipore Corp, Billerica, Mass.) after pre-equilibration in 0.1% TFA. After washing with 2×10 µl aliquots of 0.1% TFA samples were deposited directly onto the MALDI sample target using 1 µl of matrix solution 15 mg/ml of 2.5 dihydroxybenzoic acid in 50:50 acetonitrile: 0.1% TFA. Samples were allowed to air dry prior to insertion into the mass spectrometer. Analysis was performed on a Kratos Axima QIT (Shimadzu Scientific Instruments, Columbia, Md.) matrix-assisted-laser desorption/ionization (MALDI) mass spectrometer. Peptides were analyzed in positive ion mode in mid mass range (700-3000 Da). The instrument was externally calibrated with P14R (1533.86 Da) and ACTH (18-39)2465.20 Da. Precursors were selected based on signal intensity at a mass resolution width of 250 for CID fragmentation using Argon as the collision gas. (FIG. 7 shows the MALDI-QIT-TOF spectrum and MS/MS spectra of protein spot 624). Database searches were performed in house with Mascot (Matrix Sciences, Ltd., Boston, Mass.) using the Peptide Mass Fingerprint program for MS data and the MS/MS Ion Search program for CID data. Typically low abundant samples provide an insufficient number of peptides to make an identification based solely on MS information. All identifications were confirmed or established with CID (MS/MS) data. The protein spot 624 was identified as a hypothetical protein, which the protein has not discovered before except its gene sequence.

This method could be used for another application described as follows:

EXAMPLE 2

Virus Particle Separation from BmMLV

I: BmMLV virus preparation: Silkworm larvae (Kinshu× Showa strain) are injected at day 1 in the fifth instar with 150 µl of virus solution (equivalent to $1.0 \times 10^2$ BmN cells) in phosphate-buffered saline (PBS). The virus solution is prepared as follows: $1.6 \times 10^8$ BmN cells are homogenized in 75 ml of PBS and centrifuged at 7,000×G for 15 min at 4° C. After centrifugation, the supernatants are filtered (0.22-µm-pore-size filter) and used as the virus solution. BmN cells are harvested silkworm larvae, washed with PBS, and sonicated in 20 volumes of PBS. After low-speed centrifugation, the supernatants are filtered (0.22-µm-pore-size filter) and concentrated with an Amicon Ultra filter (Millipore).

II: BmMLV virus particle separation: The concentrated virus solution is subjected to the instant particle fractionation method using cesium chloride (CsCl) in buffer solution (10 mM Tris, 2 mM EDTA, pH 7.4) as an extracting density medium. The concentrated virus solution is initially suspended in the extracting medium containing 35% (w/v) CsCl. The virus suspension is transferred into a sedimentation chamber of a polyethylene receptacle, and the receptacle is inserted to a horizontally rotatable hollow disk. The sedimentation chamber is accelerated to 91,000 revolutions per minute (rpm) in an air-driven centrifuge at air pressure of 35 psi. The centrifuge speed is maintained at 91000 rpm for 30 minutes. Following the 30 minute spin, the centrifuge is decelerated to the rest. The supernatant is aspirated from the polyethylene receptacle into a container, leaving a pelleted mass within the receptacle. To the sedimentation chamber of the receptacle containing the pelleted masses is added 0.5 ml the first extract medium containing 38% CsCl (w/v). The receptacle then is vortexed for 5-6 minutes to suspend the pellet. The receptacle is inserted into the horizontally rotatable hollow disk. The sediemntation chamber is accelerated to 91000 rpm and maintained at that the speed for 2 minutes. After the centrifuge is decelerated to rest, the supernatant, the first extract fraction, is aspirated to a microcentrifuge tube for further analysis, leaving pelleted mass. To the sedimentation chamber of the receptacle containing the pelleted masses is added 0.5 ml extract medium (10 mM HEPES, 10 mM KCl, 1 mM EDTA, pH 7.4) containing 43% CsCl (w/v). The receptacle then is vortexed for 30-60 seconds to suspend the pellet. Then the receptacle is inserted into the horizontally rotatable hollow disk, which is accelerated to 91000 rpm. This extraction process is repeated using extract medium containing incrementally increasing amounts of CsCl (w/v) 48%, 53%, 58%, 63%, 68%, 73%, 78%, 83%, 88%, 93%, and 98%, to obtain a total of 13 extracted fractions. The fractions can be stored at 4° C. for further electron microscopy analysis.

Although the present invention has been described with reference to particular embodiments, it will be apparent to those skilled in the art that variations and modifications can be substituted therefore without departing from the principles of the invention.

We claim:

1. A method for the separation of particles with different densities by applying a force to a sample of particles suspended in a liquid volume of an extracting medium of specific density in a solid receptacle designed to separate said particles for such a purpose such that said particles having a density less than or equal to that of said extracting medium will not sediment and said particles having a density greater than said extracting medium will move through said liquid volume of the extracting medium in said receptacle, said method comprising the steps of:
   (a) delivering said sample to said receptacle as a suspension in said liquid volume of an extracting medium of known density;
   (b) applying said force to said sample to initiate the separation of said particles with different densities;
   (c) allowing said particles having a density greater than said extracting medium of known density to separate from the extracting medium to form a deposit on the inside vertical wall of said receptacle, such that the particles of density less than or equal to the known density of the extracting medium remain in suspension;
   (d) recovering all of the extracting medium from said receptacle to obtain said particles having a density less than or equal to that of said extracting medium of known density;
   (e) delivering to said receptacle a liquid volume of an extracting medium of a known density, which density is higher than that used in the immediately preceding extraction step;
   (f) resuspending the deposited particles in said receptacle from step (c) by agitation in the extracting medium of step (e); and
   (g) repeating steps (b)-(f) above cyclically until said deposit of particles from step (c) is not observable or a known density of an extracting medium is reached.

2. The method of claim 1, where said force is selected from the group consisting of centrifugal, magnetic, electric, and mechanical.

3. The method of claim 2, where said force is centrifugal, further comprising applying said centrifugal force to said sample for a period of time between about 1 minute to about 2 hours.

4. The method of claim 1, where said receptacle is a removable device suitable for use in a chamber in an ultracentrifuge.

5. The method of claim 1, where said receptacle contains a liquid volume of said extracting medium of specific density between about 0.001 ml to about 50 ml.

6. The method of claim 1, where said chamber containing said receptacle can be spun at a relative centrifugal force (RCF) of between about 500 G to about 200,000 G in said ultracentrifuge.

7. The method of claim 1, where said particles of different densities are selected from the group consisting essentially of biological particles, proteins, nucleic acids, phospholipids, lipopolysaccharides, polysaccharides, pharmaceutically active drug substances and metabolites thereof, cellular compartments, cellular and subcellular particles, viruses, microorganisms, inclusion bodies, organelles from cell or tissue homogenates, organelles from cell lysates, protein-protein complexes, lipoproteins and nano-particles, and non-biological particles such as micro-polymer particles and paramagnetic latex particles.

8. The method of claim 1, where said particles of step (d) are recovered by aspiration of the liquid volume of said extracting medium of specific density from said removable receptacle.

9. The method of claim 4, where said receptacle contains a liquid volume of said extracting medium of specific density between about 0.001 ml to about 50 ml.

10. The method of claim 4, where said chamber containing said receptacle can be spun at a relative centrifugal force (RCF) of between about 500 G to about 200,000 G in said ultracentrifuge.

11. The method of claim 4, where said particles of different densities are selected from the group consisting essentially of biological particles, proteins, nucleic acids, phospholipids, lipopolysaccharides, polysaccharides, pharmaceutically active drug substances and metabolites thereof, cellular compartments, cellular and subcellular particles, viruses, microorganisms, inclusion bodies, organelles from cell or tissue homogenates, organelles from cell lysates, protein-protein complexes, lipoproteins and nano-particles, and non-biological particles such as micro-polymer particles and paramagnetic latex particles.

12. The method of claim 4, where said particles of step (d) are recovered by aspiration of the liquid volume of said extracting medium of specific density from said removable receptacle.

13. The method of claim 1, where said liquid volume of extracting medium of specific density is an aqueous solution.

14. The method of claim 1, where said liquid volume of extracting medium of specific density is a non-aqueous solution.

15. The method of claim 1, where said liquid volume of extracting medium of specific density is a mixture of an aqueous solution and a non-aqueous solution.

16. The method of claim 1, where said suspension in step (a) is a colloidal or polymeric mixture.

17. The method of claim 3, where said period of time in step (b) is between about 1 to about 30 minutes.

18. The method of claim 17, where said time in step (b) is between about 1 to about 3 minutes.

19. The method of claim 1, where said density of said extracting medium in step (e) is increased in equal increments at the completion of each repetition of step (d).

20. The method of claim 19, where said density of said extracting medium in step (e) is increased by about 0.0001 g/ml to about 0.2 g/ml at the completion of said repetition of step (d).

21. The method of claim 1, where said density of said extracting medium in step (e) is increased in unequal increments at the completion of each said repetition of step (d).

22. The method of claim 21, where said density of said extracting medium in step (e) is increased by about 0.0001 g/ml to about 0.2 g/ml at the completion of said repetition of step (d).

23. The method of claim 1, where said liquid volume of extracting medium of specific density consists essentially of an aqueous mixture of a sugar and distilled, deionized water which contains a salt buffer.

24. The method of claim 23, where said sugar is selected from the group consisting essentially of sucrose, mannose, glucose and fructose.

25. The method of claim 23, where said aqueous mixture consists of about 4 to about 75% weight by volume of sucrose or mannose.

26. The method of claim 1, where said liquid volume of extracting medium of specific density consists essentially of an aqueous mixture of a salt and distilled, deionized water.

27. The method of claim 26, where said salt is selected from the group consisting essentially of inorganic or organic salts of cesium, potassium and sodium.

28. The method of claim 27, where said salt is selected from the group consisting of cesium chloride, sodium bromide, and potassium bromide.

29. The method of claim 1, where said liquid volume of extracting medium of specific density is from about 0.001 to about 2.0 milliliters.

30. The method of claim 29, where said liquid volume of extracting medium of specific density is from about 0.050 to about 0.500 milliliters.

31. The method of claim 1, where said specific density in step (a) is from about 1.0001 g/ml to about 2.0 g/ml.

32. The method of claim 1, where said particles of different densities have a density difference of about 0.0001 $g/cm^3$ to about 0.2 g/cm3.

* * * * *